(12) United States Patent
Nakai

(10) Patent No.: US 12,014,095 B2
(45) Date of Patent: Jun. 18, 2024

(54) PRINTING APPARATUS USING PRINT DATA STORED IN A SPOOL AREA, CONTROL METHOD THEREOF, AND STORAGE MEDIUM

(71) Applicant: CANON KABUSHIKI KAISHA, Tokyo (JP)

(72) Inventor: Hironobu Nakai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/989,740

(22) Filed: Nov. 18, 2022

(65) Prior Publication Data
US 2023/0161524 A1    May 25, 2023

(30) Foreign Application Priority Data
Nov. 25, 2021    (JP) ................................ 2021-191432

(51) Int. Cl.
*G06F 3/12*    (2006.01)
(52) U.S. Cl.
CPC ............ *G06F 3/1234* (2013.01); *G06F 3/121* (2013.01); *G06F 3/1236* (2013.01); *G06F 3/1253* (2013.01); *G06F 3/1286* (2013.01)
(58) Field of Classification Search
CPC ...... G06F 3/1285; G06F 3/1253; G06F 3/121; G06F 3/1236; G06F 3/1234
(Continued)

(56) References Cited

U.S. PATENT DOCUMENTS 6,226,097 B1 *   5/2001   Kimura .................... G06F 3/121
                                                                          358/1.14
2012/0133974 A1 *   5/2012   Nakamura .............. G06F 3/122
                                                                           358/1.15
(Continued)

FOREIGN PATENT DOCUMENTS

EP           2447825 A2     2/2012
JP       2003-256178 A     9/2003
(Continued)

OTHER PUBLICATIONS

European Search Report dated Apr. 5, 2023, in related European Patent Application No. 22206864.5-1224.

*Primary Examiner* — Jamares Q Washington
(74) *Attorney, Agent, or Firm* — VENABLE LLP

(57) ABSTRACT

A printing apparatus establishes a connection with an external apparatus in accordance with a predetermined communication protocol, receives, and temporarily stores in a spool area, print data transmitted from the external apparatus via the connection, and includes a printing unit to perform printing based on print data stored in the spool area. Whether or not to disconnect the connection with the external apparatus, in accordance with a setting preliminarily made by a user operation, is controlled in a case where reception of print data from the external apparatus is stopped halfway through and a predetermined time has elapsed in a state where the reception remains stopped, wherein the connection with the external apparatus is maintained in a case where the predetermined time has elapsed in a state where reception of print data from the external apparatus remains stopped and it has been set not to disconnect the connection with the external apparatus.

12 Claims, 8 Drawing Sheets

(58) Field of Classification Search
USPC .............................................. 358/1.14, 1.15
See application file for complete search history.

(56) References Cited

U.S. PATENT DOCUMENTS

| | | | |
|---|---|---|---|
| 2013/0229685 A1* | 9/2013 | Naruse | G06F 3/1294 |
| | | | 358/1.15 |
| 2015/0193183 A1 | 7/2015 | Ichikawa et al. | |
| 2017/0083266 A1 | 3/2017 | Inoue | |
| 2021/0258445 A1* | 8/2021 | Ohsugi | H04N 1/00082 |

FOREIGN PATENT DOCUMENTS

| | | | |
|---|---|---|---|
| JP | 2003256178 A | * | 9/2003 |
| JP | 2011-116083 A | | 6/2011 |
| JP | 2021056964 A | * | 4/2021 |

\* cited by examiner

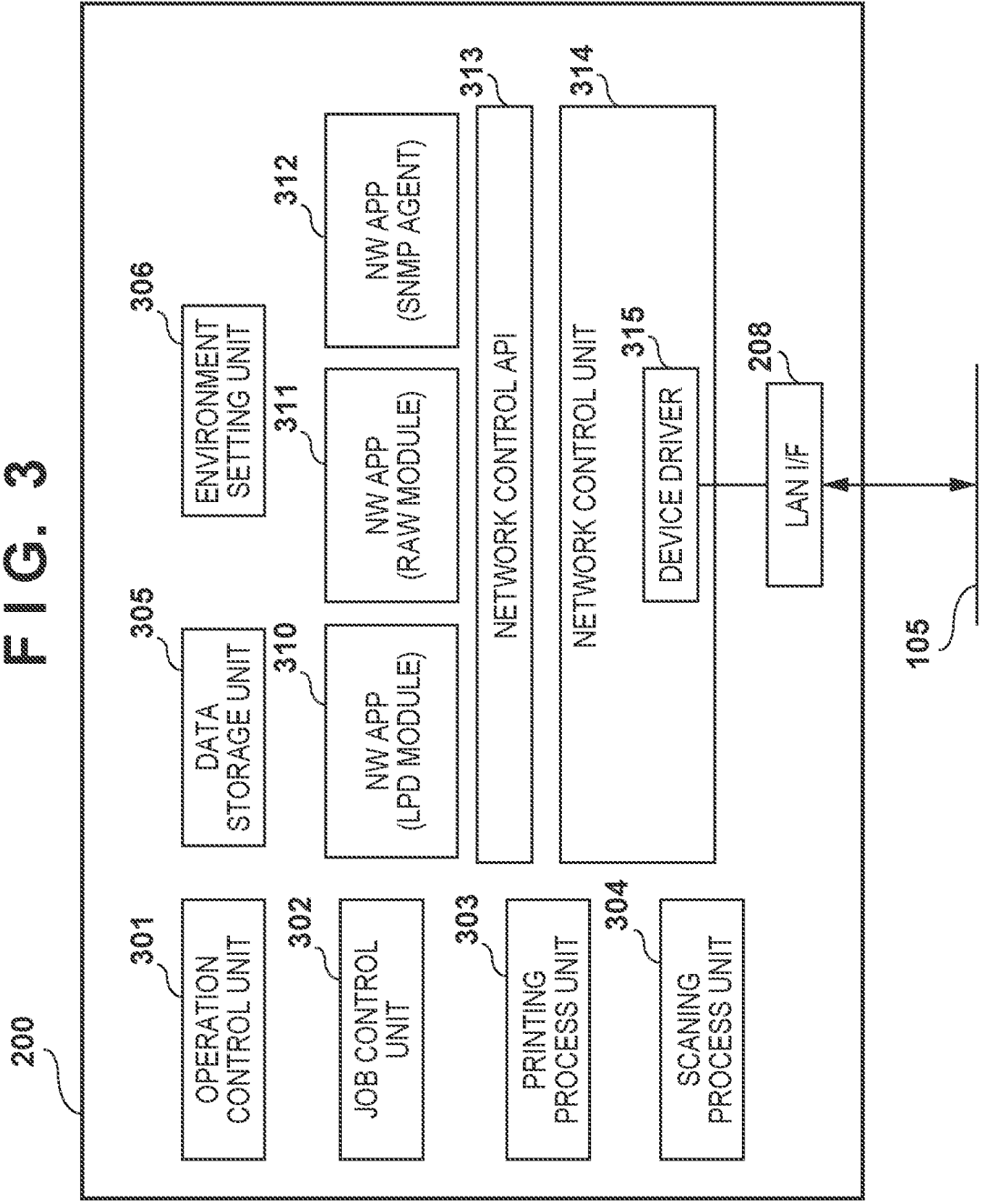

FIG. 4A

RFC1179-Line Printer Daemon Protocol

```
6.3 03 -Receive data file

+----+--------+----+-------+----+
    | 03 | Count | SP | Name | LF |
    +----+--------+----+-------+----+
    Command code -3
    Operand 1 -Number of bytes in data file
    Operand 2 -Name of data file
```

FIG. 4B

SET PRINT PORT — 400

HOST NAME: 172.29.78.130: lpr
IP ADDRESS: 172.29.78.130

PRINTING PROTOCOL
○ RAW   ○ IPP   ● LPR — 401

RAW SETTING
PORT NUMBER: 9100

IPP SETTING
URL: http://172.29.78.130/ipp

LPR SETTING
QUEUE NAME: lp

BYTE COUNT
○ ON   ● OFF — 402

FIG. 5A

```
> Internet Protocol version 4, Src: 172.29.62.159, Dst: 172.29.78.76
> Transmission Control Protocol, Src Port: 13374, Dst Port: 515, Seq: 125, Ack:4, Len: 27
v Line Printer Daemon Protocol
    LPQ: print short form of queue status / jobcmd: receive data file
    Printer / options: [39865] dfA006s-2014-p03110
                        502
```

```
0000  00 08 e3 ff fd 90 a0 d3  c1 14 2a 18 08 00 45 00   ........ ..*...E.
0010  00 43 82 f7 40 00 80 06  92 97 ac 1d 3e 9f ac 1d   .C..@... ....>...
0020  4e 4c 34 3e 02 03 f7 92  df 3d 03 e9 6d cc 50 18   NL4>.... .=..m.P.
0030  fa ed a0 ea 00 00 [03] 33  39 38 36 35 20 64 66 41   .......3 9865 dfA
0040  30 30 36 53 2d 32 30 31  34 2d 50 30 33 31 31 30   006s-201 4-P03110
0050  0a                                                  .
```

501 — Receive data file
LPR BYTE COUNT = ON EXAMPLE
SIZE INFORMATION: 39865 byte

FIG. 5B

```
> Internet Protocol version 4, Src: 172.29.62.159, Dst: 172.29.78.76
> Transmission Control Protocol, Src Port: 13351, Dst Port: 515, Seq: 125, Ack:4, Len: 37
v Line Printer Daemon Protocol
    LPQ: print short form of queue status / jobcmd: receive data file
    Printer / options: [12589990684300] dfA005s-2014-p03110
                        503
```

```
0000  00 08 e3 ff fd 90 a0 d3  c1 14 2a 18 08 00 45 00   ........ ..*...E.
0010  00 4d 82 d3 40 00 80 06  92 b1 ac 1d 3e 9f ac 1d   .M..@... ....>...
0020  4e 4c 34 27 02 03 ff d7  1d d3 00 61 1b af 50 18   NL4'.... ...a..P.
0030  fa ed b0 bf 00 00 [03] 31  32 35 38 39 39 39 30 36   .......1 23899906
0040  38 34 33 30 30 30 20 64  66 41 30 30 35 53 2d 32   843000 d fA005s-2
0050  30 31 34 2d 50 30 33 31  31 30 0a                  014-P031 10.
```

501 — Receive data file
LPR BYTE COUNT = OFF EXAMPLE
SIZE INFORMATION: 12589990684300 byte ≈ 114.5 TB

PRINTING APPARATUS USING PRINT DATA STORED IN A SPOOL AREA, CONTROL METHOD THEREOF, AND STORAGE MEDIUM

BACKGROUND I/F THE INVENTION

Field of the Invention

The present invention relates to a printing apparatus, a control method thereof, and a storage medium.

Description of the Related Art

Conventionally, there has been proposed Line Printer Remote (LPR) printing in which a printer on which an Line Printer Daemon (LPD) is running is instructed to perform printing using an LPR command from a host PC. In LPR printing, the host PC is requested, by regulations of the Request For Comment (RFC) 1179, to notify the printer of the size information of print data prior to transmission of the print data. There is known a printing system that disconnects the communication connection between the host PC and the printer after having completed transmission of print data from the host PC to the printer, by setting a value indicating a larger size than that of the actual print data in the notification of such size information.

With regard to data communication between the host PC and the printer, Japanese Patent Laid-Open No. 2003-256178 discloses a control method for setting, at the printer side, a shorter time-out time than a predetermined time-out time of the host PC to stop and resume printing. In addition, Japanese Patent Laid-Open No. 2011-116083 discloses a control method for notifying from the printer to the host PC of a size of data receivable by a receiving buffer.

In a printing system, generally, a data spool mechanism is introduced in order to smoothly receive print data in parallel with the printing operation. The data spool (spool area) includes a memory area of a predetermined size. Even when print data exceeding the size of the data spool is transmitted from the host PC to the printer, free area of the data spool will never be exhausted as long as the printing operation is smoothly performed in the printer. However, free area in the data spool may be exhausted when the printing operation is stopped due to occurrence of an error such as out-of-paper or paper jam.

When free area in the data spool is exhausted, the transmission of print data from the host PC to the printer may stop halfway through. In such a state, disconnection of the communication connection occurs between the host PC and the printer, when, for example, transition to sleep or rebooting occurs in the host PC, or when transition to sleep (error sleep) occurs in the printer without the error being resolved. As a result, it is no longer possible to normally perform a cancel operation of the print job in the printer, and printed material may be output with occurring an abnormality such as an incorrect character string printed thereon. In addition, when the size of the print data is smaller than the size of the data spool, the print job may disappear even though there is no cancel operation performed.

SUMMARY I/F THE INVENTION

Accordingly, the present invention provides a technique that allows for normally resuming a printing process even when reception of print data from an external apparatus is stopped halfway through in a printing apparatus.

According to one aspect of the present invention, there is provided a printing apparatus capable of communicating with an external apparatus, the printing apparatus comprising: an establishment unit configured to establish a connection with an external apparatus in accordance with a predetermined communication protocol; a reception unit configured to receive, and temporarily store in a spool area, print data transmitted from the external apparatus via the connection; a printing unit configured to perform a printing process based on print data stored in the spool area; and a control unit configured to control whether or not to disconnect the connection with the external apparatus from the printing apparatus side, in accordance with a setting preliminarily made by a user operation, in a case where reception of print data from the external apparatus is stopped halfway through and a predetermined time has elapsed in a state where the reception remains stopped.

According to another aspect of the present invention, there is provided a printing apparatus capable of communicating with an external apparatus, the printing apparatus comprising: an establishment unit configured to establish a connection with an external apparatus in accordance with a predetermined communication protocol; a reception unit configured to receive, and temporarily store in a spool area, print data transmitted from the external apparatus via the connection; a printing unit configured to perform a printing process based on print data stored in the spool area; and a control unit configured to control whether or not to disconnect the connection with the external apparatus from the printing apparatus side, based on a size of the print data transmitted from the external apparatus and a size of the spool area, in a case where reception of print data from the external apparatus is stopped halfway through and a predetermined time has elapsed in a state where the reception remains stopped.

According to still another aspect of the present invention, there is provided a method for controlling a printing apparatus capable of communicating with an external apparatus, the method comprising: establishing a connection with an external apparatus in accordance with a predetermined communication protocol; receiving, and temporarily storing in a spool area, print data transmitted from the external apparatus via the connection; performing a printing process based on print data stored in the spool area; and controlling whether or not to disconnect the connection with the external apparatus from the printing apparatus side, in accordance with a setting preliminarily made by a user operation, in a case where reception of print data from the external apparatus is stopped halfway through and a predetermined time has elapsed in a state where the reception remains stopped.

According to yet another aspect of the present invention, there is provided a method for controlling a printing apparatus capable of communicating with an external apparatus, the method comprising: establishing a connection with an external apparatus in accordance with a predetermined communication protocol; receiving, and temporarily storing in a spool area, print data transmitted from the external apparatus via the connection; performing a printing process based on print data stored in the spool area; and controlling whether or not to disconnect the connection with the external apparatus from the printing apparatus side, based on a size of the print data transmitted from the external apparatus and a size of the spool area, in a case where reception of print data from the external apparatus is stopped halfway through and a predetermined time has elapsed in a state where the reception remains stopped.

According to yet still another aspect of the present invention, there is provided a non-transitory computer readable storage medium storing a program for causing a computer to execute a method for controlling a printing apparatus capable of communicating with an external apparatus, the method comprising: establishing a connection with an external apparatus in accordance with a predetermined communication protocol; receiving, and temporarily storing in a spool area, print data transmitted from the external apparatus via the connection; performing a printing process based on print data stored in the spool area; and controlling whether or not to disconnect the connection with the external apparatus from the printing apparatus side, in accordance with a setting preliminarily made by a user operation, in a case where reception of print data from the external apparatus is stopped halfway through and a predetermined time has elapsed in a state where the reception remains stopped.

Further features of the present invention will become apparent from the following description of exemplary embodiments (with reference to the attached drawings).

BRIEF DESCRIPTION I/F THE DRAWINGS

FIG. 3 is a block diagram illustrating an exemplary functional configuration of an MFP;

FIGS. 4A and 4B illustrate a part of a specification of an LPR command, and an exemplary setting screen of the host PC;

FIGS. 5A and 5B illustrate exemplary packets relating to LPD printing;

DESCRIPTION I/F THE EMBODIMENTS

Figure 1:
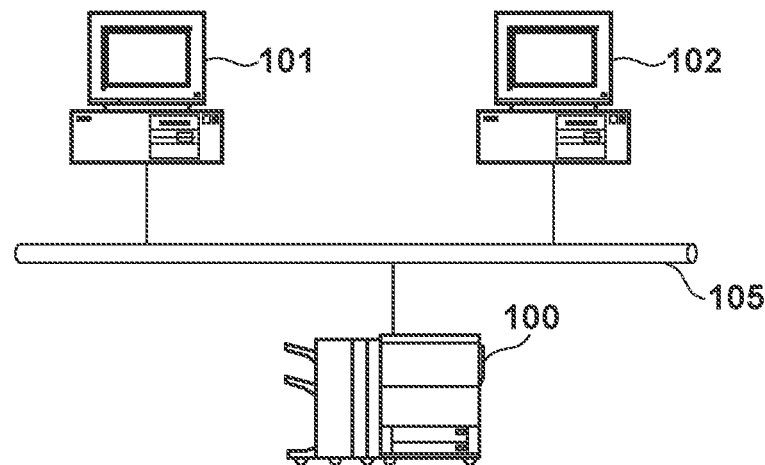
FIG. 1 illustrates an exemplary network configuration.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 illustrates an exemplary wireless network configuration according to the present embodiment. A Multi-Function Peripheral (MFP) 100 is connected to a Local Area Network (LAN) 105. Although the LAN 105 may be configured as a wired LAN, it may also be configured as a wireless LAN. The LAN 105 also has PCs 101 and 102 connected thereto. The MFP 100 can communicate with the PCs 101 and 102 via the LAN 105. The PCs 101 and 102 can cause the MFP 100 to execute a print job by transmitting the print job to the MFP 100 via the LAN 105. The PCs 101 and 102 may also be referred to as client PCs or host PCs.

<Hardware Configuration of MFP>

Figure 2:
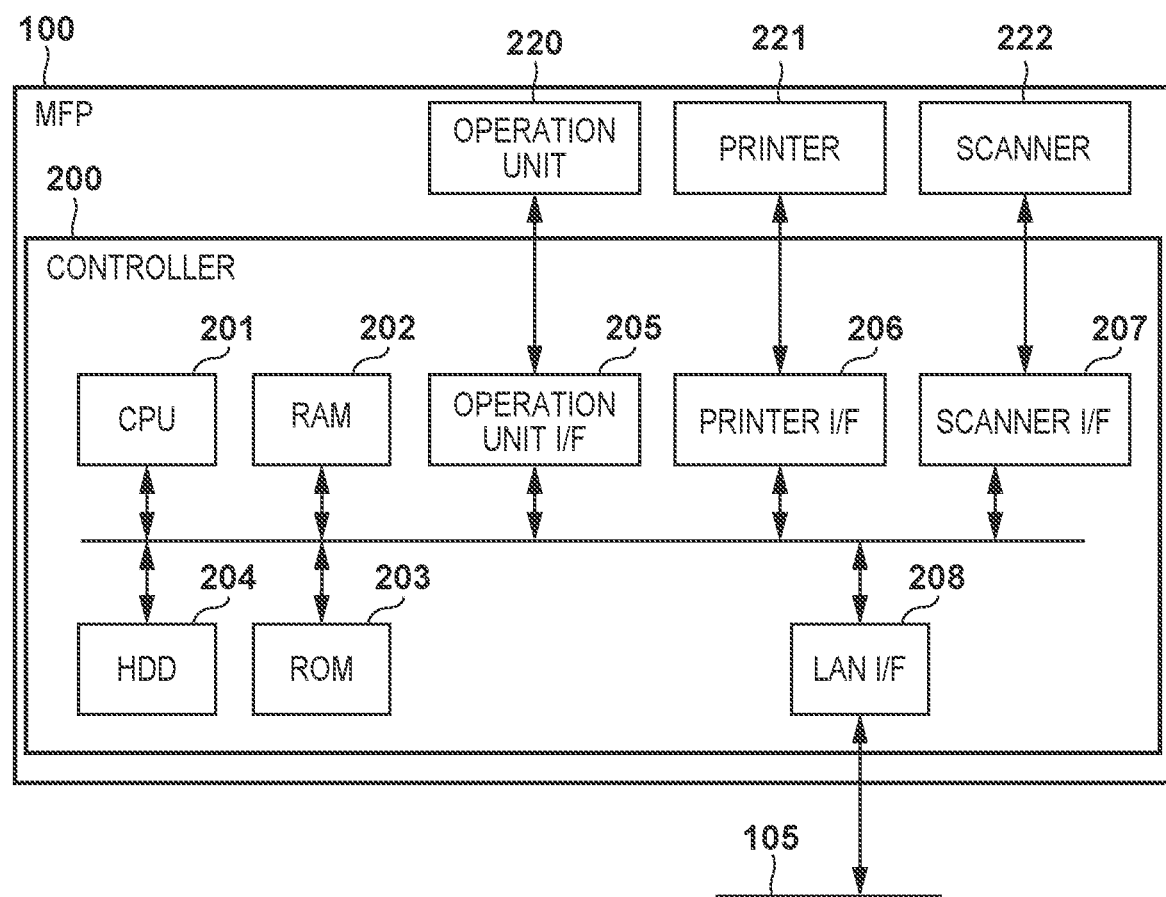
FIG. 2 is a block diagram illustrating an exemplary hardware configuration of an MFP.

FIG. 2 is a block diagram illustrating an exemplary hardware configuration of the MFP 100. The MFP 100 includes a controller (control unit) 200 as well as an operation unit 220, a printer (printer engine) 221, and a scanner 222 connected to the controller. The controller 200 includes a CPU 201 and configured to control the operation of the MFP 100 as a whole. The controller 200 further includes the CPU 201, a RAM 202, a ROM 203, a hard disk drive (HDD) 204, an operation unit interface (I/F) 205, a printer I/F 206, a scanner I/F 207, and a LAN I/F 208.

The CPU 201 performs various control or processing such as communication control and image processing by loading to the RAM 202 a control program stored in the ROM 203 or the HDD 204, and reading and executing the loaded control program. The RAM 202 is a volatile storage medium (storage apparatus) used as a main memory and a work area of the CPU 201. The HDD 204 is a non-volatile storage medium (storage apparatus). The HDD 204, having various data and programs stored therein, is also used for temporarily storing image data generated in a printing process or a copying process. As such, hardware components such as the CPU 201, the ROM 203, the RAM 202, the HDD 204 or the like make up a so-called computer. Although it is assumed in the MFP 100 of the exemplary embodiment that a single CPU 202 uses a control program loaded in a single memory (RAM 202) to execute each process illustrated in the flowchart described below, other aspects are also conceivable. For example, each process illustrated in the flowchart described below can also be executed by coordinating a plurality of processors, memories, and storages.

The printer I/F 206 is an interface configured to connect the printer 221 and the controller 200. The printer 221 performs a printing process for printing (forming) an image on a sheet fed from a sheet feed unit (not illustrated) such as a sheet feed cassette, based on the image data input from the controller 200 via the printer I/F 206. The printer 221 performs image forming by an electrophotographic type or an ink-jet type, for example.

The scanner I/F 207 is an interface configured to connect the scanner 222 and the controller 200. The scanner 222 reads an image of an original document placed on a document base to generate image data. The image data generated by the scanner 222 is input to the controller 200 via the scanner I/F 207, and may be used for printing by the printer 221, stored in the HDD 204, or transmitted to an external apparatus via the LAN I/F 208.

The operation unit I/F 205 is an interface configured to connect the operation unit 220 and the controller 200. The operation unit 220 accepts a user operation (e.g., operations for various settings of the MFP 100). The operation unit 220 includes a display device (display unit) configured to display a screen, and can display a state of the MFP 100, for example.

The LAN I/F 208 is a communication I/F connected to the LAN 105 and can communicate with an external apparatus via the LAN 105. The CPU 201 can, for example, transmit the image data generated by the scanner 222 to an external apparatus via the LAN I/F 208, or receive, from an external apparatus, print data including image data for printing by the printer 221. Here, the MFP 100 may further include a wireless LAN I/F that can connect to the wireless LAN.

<Functional Configuration of MFP>

FIG. 3 is a block diagram illustrating an exemplary software configuration (functional configuration) of the MFP 100. The function of each block (software) illustrated in FIG. 3 is implemented in the MFP 100 by the CPU 201 that reads out to the RAM 202 and executes a program stored in the ROM 203 or the HDD 204.

An operation control unit 301 displays a user-oriented screen (operation screen) on the operation unit 220, and accepts a user operation via the operation unit 220. The operation control unit 301 performs a process relating to a display object, such as a button on the display screen, in accordance with the accepted user operation. In the present embodiment, for example, the operation control unit 301 displays on the operation unit 220 a setting screen 600 illustrated in FIG. 6 and described below. The operation control unit 301 can further accept a setting of whether or not to disconnect, from the MFP 100 side, the connection with the external apparatus in a case where a predetermined time has elapsed in a state where reception of print data from the external apparatus (host PC) remains stopped.

Based on a request from each functional unit (control unit), a data storage unit 305 stores data such as setting values in the ROM 203 or the HDD 204, and reads the stored data. For example, when the user desires to change the setting of a certain device, the operation control unit 301 accepts the user's input via the operation unit 220 and requests the data storage unit 305 to store the setting value corresponding to the input contents. The data storage unit 305 stores the setting value in the ROM 203 or the HDD 204 in accordance with the request from the operation control unit 301. In addition, the data storage unit 305 secures, in a storage area of a volatile memory such as the RAM 202 or a non-volatile memory such as the HDD 204, a spool area (data spool) that temporarily stores print data received from the external apparatus (host PC).

An environment setting unit 306 performs environment setting of the MFP 100, when activating the system or upon detecting change of the setting, in accordance with the setting value stored in the data storage unit 305. Specifically, the environment setting unit 306 performs various network settings including setting of IP address, and various parameter settings for the print function and copy function included in the MFP 100.

NW apps 310 to 312 are application modules that operate on the MFP 100 to execute network functions. Although there will be described a configuration in which these three NW apps operate on the MFP 100 in the present embodiment, any number of applications may operate on the MFP 100 as long as they are applications that realize the functions of the MFP 100 using the network function.

The NW app 310 is a Line Printer Daemon (LPD) module corresponding to an LPD protocol. The LPD module is an application that performs a reception process for receiving print data from an external apparatus such as the PC 101 using a Line Printer Remote (LPR) command. Here, the specification of LPD is standardized by RFC 1179. The NW app 311 is a RAW module. The RAW module is an application that performs a reception process for receiving print data from an external apparatus such as the PC 102 using a port 9100 of the TCP/IP. The NW app 312 is an application for managing device information of the MFP 100.

The NW app 312 collects information of device configurations and consumables of the MFP 100 in response to a request from an external apparatus such as the PC 102, and outputs a response including the collected information. In the present embodiment, the NW app 312 is configured as a Simple Network Management Protocol (SNMP) agent that outputs the device information in the form of a management information base (MIB object) in accordance with SNMP defined in the RFC 1157.

A network control unit 314 is formed of protocol stacks and is configured as part of an OS that collectively controls the controller 200. Generally, a protocol stack is equivalent to a program group having software functions stacked in a hierarchical manner, the group including a plurality of programs respectively corresponding to protocols for implementing the network functions. The protocol stack may be formed of a session layer, a transport layer, a network layer, and a data link layer, conforming to the OSI reference model. The session layer performs connection control or the like. The transport layer manages data transfer. The network layer controls address management and path selection. The data link layer performs identification and transfer of data frames. The network control unit 314 (protocol stack) of the present embodiment further includes a device driver 315 for controlling the LAN I/F 208.

A network control API 313, being an API library for invoking a protocol stack included in the network control unit 314, is provided in the OS as a general socket function (socket API). The environment setting unit 306 and the NW apps 310 to 312 perform data communication conforming to respective communication protocols by setting parameters in the network control API 313 and invoking the network control API.

A job control unit 302 controls execution of respective jobs of a plurality of functions (such as copy function, print function, and file transmission function) included in the MFP 100. When executing a print job, the job control unit 302 uses the NW app 310 to establish a connection with an external apparatus (host PC) in accordance with an LPD protocol. The job control unit 302 receives print data transmitted from the external apparatus via the established connection, and temporarily stores the received print data in the spool area.

A printing process unit 303 performs a printing process based on the print data received from an external apparatus and stored in the spool area, in accordance with an instruction from the job control unit 302. Specifically, the printing process unit 303 interprets the print data to generate image data, transmits the generated image data to the printer 221 via the printer I/F 206, and causes the printer 221 to print the image data.

A scanning process unit 304 causes, via the scanner I/F 207, the scanner 222 to read an image of an original document to generate image data, and store the image data in the HDD 204 as scanned image data, in accordance with an instruction from the job control unit 302.

Note that the printing process unit 303 can also read out the scanned image data stored by the scanning process unit 304, and perform a printing process based on the image data. For example, when executing a copy function, the operation control unit 301 instructs the job control unit 302 to execute the copy function, upon accepting an execution instruction of the copy function from the user via the operation unit 220. The job control unit 302 instructs the scanning process unit 304 to read the original document, and acquires the scanned image data from the scanning process unit 304. By instructing the printing process unit 303 to perform a printing process based on the acquired scanned image data, the job control unit 302 further outputs a sheet having the image of the original document printed thereon as a copy result of the original document.

<LPR Command and LPR Setting>

FIG. 4A illustrates a part of the RFC 1179 specification defining a Line Printer Daemon (LPD) protocol, and illustrates a specification of the LPR command which is a control command relating to the received data file. As illustrated in this figure, this LPR command has stored therein size information (number of bytes) of a data file next to a command code "03", and further a name of the data file next to a one-character space. The LPR command has been transmitted from the host PC to the printing apparatus (MFP 100) on which the LPD is running, before transmission of a main body of the print data is performed.

FIG. 4B illustrates an exemplary setting screen (setting screen 400) for setting a print port at the host PC side that instructs the MFP 100 to execute printing using an LPR command. In the setting screen 400, "RAW", "IPP" and "LPR" can be selected as a printing protocol (communication protocol) to be used. In the example of FIG. 4B, "LPR" is selected as the printing protocol, as indicated by a reference numeral 401. The setting screen 400 also allows for setting whether or not to enable an LPR byte count, as an LPR setting. In the example of FIG. 4B, a setting that turns the LPR byte count "OFF" is selected as the LPR setting, as indicated by a reference numeral 402. In other words, a setting that does not enable the LPR byte count is selected.

FIG. 5A illustrates an example of reception packets including a LPR command in a case where the LPR byte count is enabled (LPR byte count=ON). In the packet illustrated in FIG. 5A, a predetermined range starting from the position of the command code "03" indicated by reference numeral 501 corresponds to the LPR command indicating the received data file. As has been described referring to FIG. 4, the size information 502 has appropriately set therein size information indicating the size of the print data to be transmitted from the host PC to the printing apparatus (MFP 100), in a case where the LPR byte count is enabled at the host PC side. In the present example, a size of "39865" bytes has been set as the size information 502.

FIG. 5B illustrates an example of reception packets including the LPR command in a case where the LPR byte count is not enabled (LPR byte count=OFF). In the packet illustrated in FIG. 5B, a predetermined range starting from position of the command code "03" indicated by reference numeral 501 corresponds to the LPR command indicating the received data file. The size information 502 has not appropriately set therein the size information indicating the size of the print data to be transmitted from the host PC to the printing apparatus (MFP 100). In the present example, a size of "125899906843000" bytes (~114.5 [TB]) is set as the size information 503, in other words, size information indicating a large imaginary file size is set.

<Setting Screen>

Figure 6:
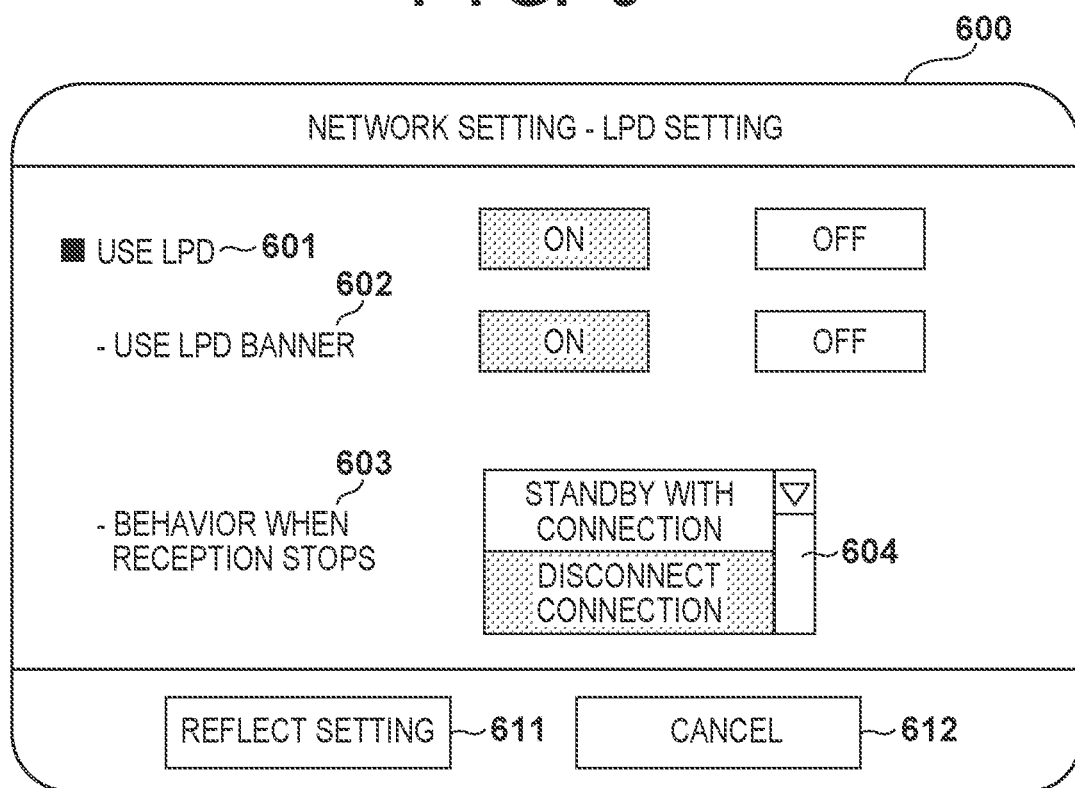
FIG. 6 illustrates an exemplary setting screen relating to the LPD in the MFP.

FIG. 6 illustrates an example of a setting screen (setting screen 600) displayed on the operation unit 220 of the MFP 100 according to the present embodiment. The setting screen 600 is used for performing setting related to printing by the LPD. The setting screen 600 includes setting items 601 to 603 as those for the network settings (LPD settings). The setting item 601 indicates whether or not to use the LPD printing function. The setting can be made using the ON and the OFF button. The operation control unit 301 performs display control of the operation unit 220 so that either the ON or OFF button is selected according to the user operation with respect to the setting item 601. In order to use the LPD printing function on the MFP 100, the user needs to select the ON button with respect to the setting item 601.

The setting item 602 indicates whether or not to print a banner page for each print job in LPD printing. The setting can be made using the ON and the OFF button. The operation control unit 301 performs display control of the operation unit 220 so that either the ON or OFF button is selected according to the user operation with respect to the setting item 602. When a setting is made to print a banner page (not illustrated), information such as a user name of the user who has instructed execution of the print job, and the file name used to execute the print job are printed as a partition page of the print job.

The setting item 603 indicates a setting of the operation (behavior) of the MFP 100 after the printing operation is stopped due to, for example, out-of-paper or paper jam, and a predetermined time has elapsed therefrom. The setting can be made using a drop-down list 604. Specifically, a setting is made either to keep waiting while maintaining the TCP/IP connection with the host PC ("standby with connection"), or to disconnect the TCP/IP connection ("disconnect connection"). The setting of the setting item 603 is reflected in the setting value of a reset response flag stored in the ROM 203 or the HDD 204.

The reset response flag indicates whether or not to disconnect the connection (TCP/IP connection) with the external apparatus from the printing apparatus side (the MFP 100 side), in a case where a predetermined time has elapsed while reception of print data from the external apparatus (host PC) remains stopped. When "standby with connection" is selected as a setting of the setting item 603, the reset response flag is set to OFF. In other words, a setting is made not to disconnect the connection with the external apparatus from the printing apparatus side (MFP 100 side), in a case where a predetermined time has elapsed while reception of print data from the external apparatus (host PC) remains stopped. In a case where, on the other hand, "disconnect connection" is selected as a setting of the setting item 603, the reset response flag is set to ON. In other words, a setting is made to disconnect the connection with the external apparatus from the printing apparatus side (the MFP 100 side), in a case where a predetermined time has elapsed while reception of print data from the external apparatus (host PC) remains stopped. Disconnection of the connection is performed by transmitting an RST packet (RST command) to the external apparatus (host PC) as a disconnection request for requesting to disconnect the connection.

Pressing (touching) a setting reflection button 611 on the setting screen 600 causes the setting contents on the setting screen 600 to be enabled by being stored by the data storage unit 305. The NW app 310 (LPD module) refers to and uses the stored setting contents. Subsequent to pressing of the setting reflection button 611, the operation control unit 301 causes the display screen of the operation unit 220 to transition from the setting screen 600 to a setting screen (not illustrated) relating to higher-level setting items. In a case where, on the other hand, the cancel button 612 is pressed, similar transition of the display screen is performed without the setting contents being reflected.

<Processing Procedure>

Figure 7:
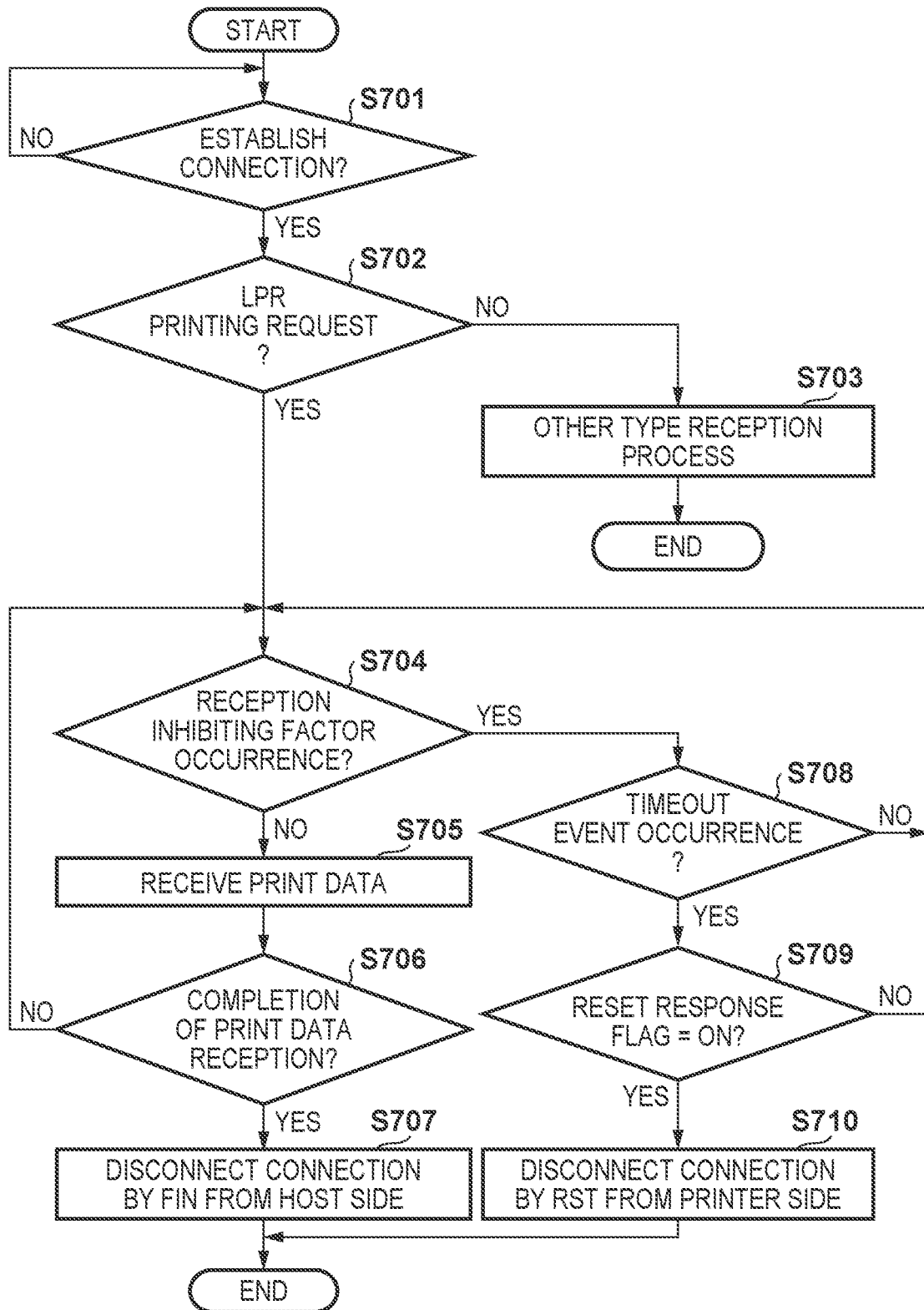
FIG. 7 is a flowchart illustrating a procedure of a print data reception process (first embodiment)

FIG. 7 is a flowchart illustrating a procedure of a print data reception process to be performed by the CPU 201 in the MFP 100 according to the present embodiment. The processing at each step of FIG. 7 can be realized in the MFP 100 by the CPU 201 by reading out a program stored in the ROM 203 or the HDD 204 to the RAM 202 and executing the program thereon.

Upon the MFP 100 being powered ON, the CPU 201 performs various initialization processes (not illustrated).

Thus, upon the MFP 100 being available as a printer connected to the network, the CPU 201 starts execution of the process according to the procedure illustrated in FIG. 7.

First, at step S701, the CPU 201 enters a standby state to wait for establishment of a connection based on TCP/IP. Upon receiving a request packet for communication establishment from the host PC (external apparatus) such as the PC 101 or 102 via the LAN I/F 208, the CPU 201 establishes connection with the host PC according to the request packet.

After having established the connection, the CPU 201 determines at step S702 whether or not the request from the host PC in the established connection is a printing request (LPR printing request) by an LPR command. Upon determining that the request from the host PC is not an LPR printing request, the CPU 201 advances the process to step S703, or advances the process to S704 upon determining that the request is an LPR printing request.

At step S703, the CPU 201 receives print data from the host PC by a different type of reception process other than the reception process based on the LPR printing request, and terminates the process. Here, the different type of reception process may be based on, for example, a printing request according to the RAW Protocol (TCP port 9100), or a printing request according to the IPP (Internet Printing Protocol). Subsequently, the CPU 201 starts execution of the process according to the procedure illustrated in FIG. 7, and enters the standby state to wait for establishment of connection at step S701.

In the case of advancing the process from step S702 to step S704, the CPU 201 determines whether or not an inhibiting factor has occurred that inhibits reception of print data. An inhibiting factor includes, for example, out-of-paper, paper jam, shortage of consumables required for printing, or the like in the MFP 100. Upon occurrence of such an inhibiting factor, reception of print data from the host PC is stopped halfway through (reception can no longer be smoothly performed). For example, in a case where the printing process is stopped and unprocessed print data continues to accumulate in the spool area, and thus free area of the spool area becomes to be in an exhausted state, reception of print data from the host PC (external apparatus) is obliged to be stopped. As such, reception of print data is inhibited.

Upon determining that there has not occurred any inhibiting factor that inhibits reception of the print data, the CPU 201 advances the process to step S705. At step S705, the CPU 201 receives print data from the host PC via the established connection. Here, the received print data is temporarily stored in the spool area and successively used in the printing process. Subsequently, at step S706, the CPU 201 determines whether or not reception of print data has been completed. The print data is transmitted from the host PC in a manner divided into a plurality of packets over the network. The CPU 201 therefore determines at step S706 whether or not reception has been completed for all of the plurality of packets in one sequence which have been divided from the print data. In a case where reception of print data is not completed (reception of packets continuing), the CPU 201 returns the process from step S706 to step S704 and repeats the process of steps S704 to S706.

Upon completion of receiving the print data, the CPU 201 transmits, to the host PC, a reception acknowledgement with respect to the last reception packet, and advances the process from step S706 to step S707. At step S707, the CPU 201 disconnects the connection with the host PC by receiving the FIN packet transmitted from the host PC in response to receiving the reception acknowledgement. In other words, transmission of the FIN packet causes disconnection of the connection with the printer (MFP 100) from the host PC side. Upon completion of disconnection of the connection with the host PC in the aforementioned manner, the CPU 201 terminates the reception process of print data according to the procedure illustrated in FIG. 7.

On the other hand, upon determining at S704 that there has occurred an inhibiting factor that inhibits reception of print data, the CPU 201 advances the process to step S708. At step S708, the CPU 201 determines whether or not a time-out event has occurred according to a predetermined timer. The predetermined timer, which is activated in accordance with occurrence of an inhibiting factor, is used to measure the elapsed time from occurrence of an inhibiting factor. The CPU 201 determines that a time-out event has occurred when the timer reaches a predetermined time (upper limit time). The time-out event is an event indicating that a predetermined time has elapsed (a time-out has occurred) in a state where reception of print data remains stopped without the inhibiting factor that inhibits reception of the print data being resolved. Upon determining that a time-out event has occurred, the CPU 201 advances the process to step S709, or returns the process to step S704 upon determining that there is no time-out event having occurred.

At step S709, the CPU 201 determines whether or not the reset response flag is set to ON. As described above, the setting value of the reset response flag is stored in the ROM 203 or the HDD 204, in accordance with the setting made using the setting screen 600. The CPU 201 determines whether or not the reset response flag is set to ON by referring to the stored setting value of the reset response flag.

In a case where the reset response flag is set to ON (i.e., in a case where the setting item 603 on the setting screen 600 is set to "disconnect connection"), the CPU 201 advances the process to step S710. As such, in a case where a setting is made to disconnect the connection with the host PC from the printer side, as an operation when reception of print data is stopped due to occurrence of an inhibiting factor, the CPU 201 advances the process to step S710. In a case where, on the other hand, the reset response flag is set to OFF (i.e., in a case where the setting item 603 on the setting screen 600 is set to "standby with connection"), the CPU 201 returns the process to step S704. As such, in a case where a setting is made to maintain the connection with the host PC and standby without transmitting the RST packet to the host PC, as an operation when reception of print data is stopped due to occurrence of an inhibiting factor, the CPU 201 returns the process to step S704.

At step S710, the CPU 201 transmits, via the LAN I/F 208, the RST packet (RST command) to the host PC which is the transmission source of print data. The RST packet corresponds to a disconnection request of TCP/IP. Transmission of the RST packet causes disconnection of the connection with the host PC proactively from the printer (MFP 100) side.

As such, the CPU 201 controls whether or not to disconnect the connection with the external apparatus (host PC) from the MFP 100 side, in accordance with the setting (reset response flag setting) preliminarily performed via a user operation. Specifically, the CPU 201 transmits the RST packet to the external apparatus in a case where a predetermined time has elapsed in a state where reception of print data from the external apparatus remains stopped, and a setting has been made to disconnect the connection with the external apparatus from the MFP 100 side. The RST packet corresponds to a disconnection request for requesting to disconnect the connection. On the other hand, the CPU 201 maintains the connection with the external apparatus in a case where a predetermined time has elapsed in a state where reception of print data from the external apparatus remains stopped, and a setting has not been made to disconnect the connection with the external apparatus from the MFP 100 side.

Upon completion of disconnection of the connection with the host PC subsequent to transmission of the RST packet at step S710, the CPU 201 terminates the reception process of print data according to the procedure illustrated in FIG. 7.

<Effect of Operation Switching When Reception is Stopped>

In the present embodiment, the operation (operation mode) of the MFP 100 when reception of print data from the host PC is stopped due to occurrence of an inhibiting factor is switched based on the settings using the setting screen 600. Such operation switching has the following effects.

Let us assume a case where the host PC (PC 101 or 102) uses the LPR protocol of a standard TCP/IP port in a Microsoft Windows operating system (OS) for a printing process. In such a case, the standard TCP/IP port is provided with a threshold value for a standby time with connection (time-out time). The print job is canceled at the host PC side in a case where, when reception of print data remains stopped, the connection with the host PC is kept maintained and the printing process does not proceed after the time-out time (reception of print data not resumed) has expired.

The present embodiment allows for avoiding the aforementioned problem by setting the setting item 603 on the setting screen 600 to "disconnect connection". Specifically, before the print job is canceled in the host PC, transmission of the RST packet (S710) causes disconnection of the TCP/IP connection proactively from the MFP 100 side. To this end, the predetermined time relating to the time-out event (S708) is defined to be a shorter time than the time-out time until the external apparatus (host PC) cancels the print job in a case where reception of print data by the MFP 100 is not resumed. As such, before the print job is canceled in the host PC, a retry operation of printing is performed between the host PC and the MFP 100 via the aforementioned standard TCP/IP port. As a result, it becomes possible to avoid cancellation of the print job and output the printed material. In other words, it becomes possible for the MFP 100 (printing apparatus) to normally resume the printing process, even when reception of print data from the host PC is stopped halfway through.

Here, the operation control unit 301 may be configured so that it can change the predetermined time related to the aforementioned time-out event (S708), in accordance with the user operation accepted via a setting screen (not illustrated) displayed on the operation unit 220.

In addition, let us assume a case where the host PC (PC 101 or 102) uses a Common Unix Printing System (CUPS) of a Linux OS in the printing process. In such a case, disconnecting the TCP/connection from the MFP 100 side may cause the following problem. When the TCP/connection is disconnected, the print job is stopped in the host PC according to the default setting of the CUPS. Unlike printing processes that use the Windows standard TCP/IP port, print job cancellation does not occur at the host PC. However, in order to resume a stopped print job, it is necessary to log in to the Linux system with an authority equivalent to that of the system administrator to perform a resume operation.

The present embodiment allows for avoiding the aforementioned problem by setting the setting item 603 on the setting screen 600 to "standby with connection". In the default setting of the CUPS, a threshold (time-out time) for a standby time with connection is not set in contrast to the Windows standard TCP/IP port. Therefore, keeping standby while maintaining the TCP/IP connection between the host PC and the MFP 100 prevents stoppage of the print job in the host PC as has been described above. In addition, the foregoing eliminates the necessity of logging in with an authority equivalent to that of the system administrator to resume the print job. As a result, it becomes possible to normally resume the printing process after the reception inhibiting factor of the print data in the MFP 100 has been resolved.

In the present embodiment, as has been described above, the CPU 201 establishes a connection with an external apparatus (host PC) in accordance with a predetermined communication protocol, receives print data transmitted from the external apparatus via the connection, and temporarily stores the print data in the spool area. The CPU 201 executes a printing process based on the print data stored in the spool area. In a case where reception of print data from the external apparatus is stopped halfway through and a predetermined time has elapsed in a state where the reception remains stopped, the CPU 201 further controls whether or not to disconnect the connection with the external apparatus from the MFP 100 side, in accordance with a setting preliminarily made by a user operation. Accordingly, it becomes possible to normally resume the printing process even when reception in the MFP 100 of print data from the external apparatus is stopped halfway through.

Second Embodiment

Next, there will be described a second embodiment of the present disclosure. In the following, description of parts similar to those of the first embodiment will be omitted.

In the first embodiment, in a case where reception of print data remains stopped, switching is performed between transmitting (S710) the RST packet from the printer side, and waiting for reception (S707) of the FIN packet from the host PC, in accordance with settings on the setting screen 600. Settings on the setting screen 600 are made in a manner appropriate for the operating system (OS) of the host PC connected to the MFP 100, or appropriate for the print data transmission application used in the host PC.

However, in a case where the MFP 100 is shared by a plurality of host PCs, for example, it is also conceivable that a plurality of host PCs each having different OSs (e.g., Windows OS and Linux OS) installed therein are connected to the MFP 100. In such a case, it is desirable that the aforementioned switching of operations, in a case where reception of print data remains stopped, can be dynamically performed to match with the host PC being connected.

In addition, it is also conceivable that, in a case where the host PC is using Windows OS, an application on the Windows OS operates similarly to the CUPS of the Linux OS, instead of a printing process using the standard TCP/IP port of the Windows OS.

In such a case, it is desirable to set the setting item 603 on the setting screen 600 to "standby with connection", instead of "disconnect connection" in accordance with the printing process using the standard TCP/IP port of the Windows OS.

The present embodiment therefore allows for dynamically performing the aforementioned switching of operations in a case where reception of print data remains stopped in the MFP 100. Specifically, control is performed as to whether or not to disconnect the connection with the external apparatus from the MFP 100 side, based on a size of print data transmitted from the external apparatus (host PC) and a size of the spool area for temporarily storing the print data.

<Processing Procedure>

Figure 8:
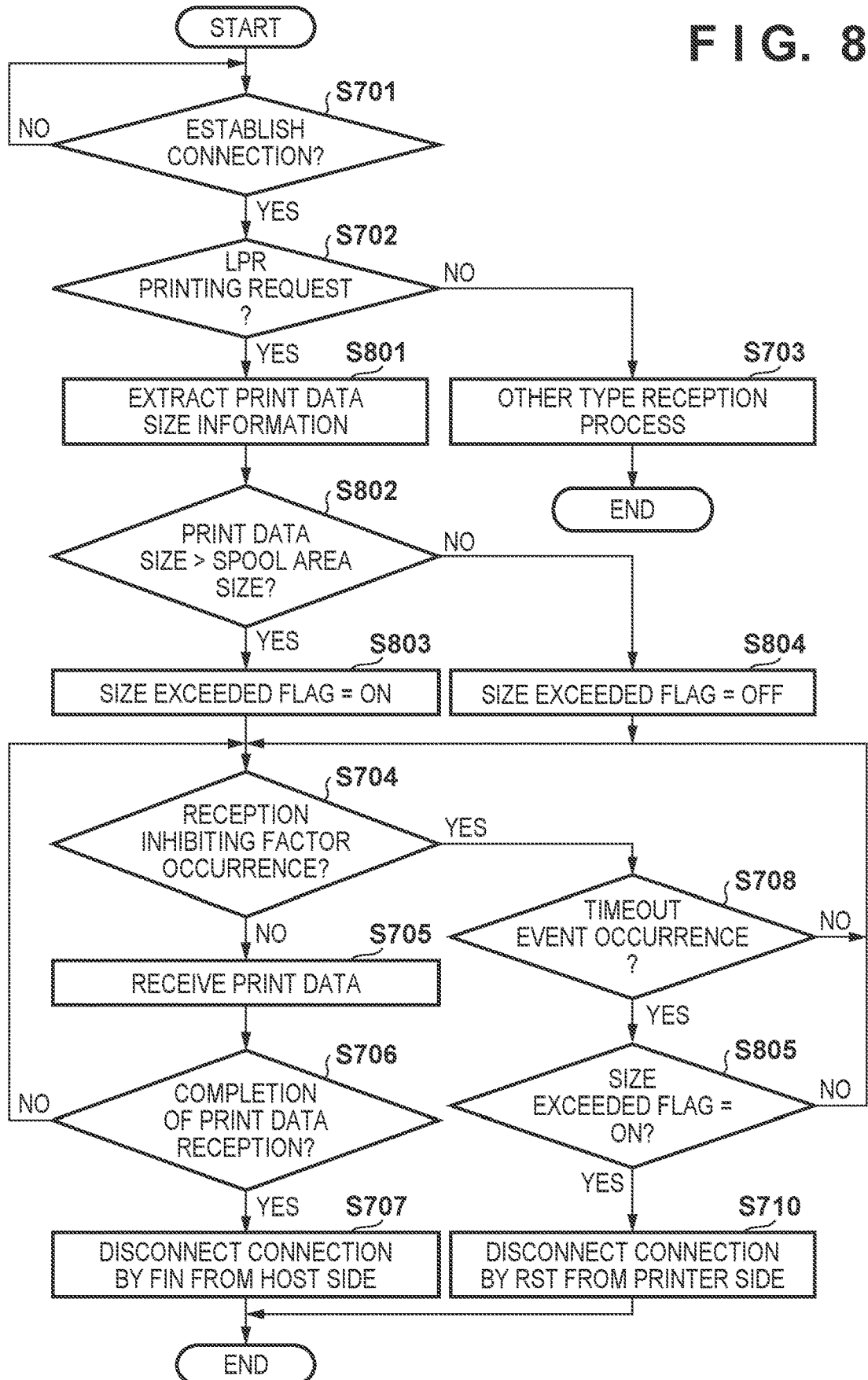
FIG. 8 is a flowchart illustrating a procedure of a print data reception process (second embodiment)

FIG. 8 is a flowchart illustrating a procedure of the print data reception process to be executed by the CPU 201 in the MFP 100, according to the present embodiment. The processing at each step of FIG. 8 can be realized in the MFP 100 by the CPU 201 that reads out a program stored in the ROM 203 or the HDD 204 to the RAM 202 and executes the program thereon.

The processing of steps S701 to S703 are similar to those in the first embodiment. In the present embodiment, the CPU 201 advances the process to step S801 upon determining at step S702 that the request from the host PC is an LPR printing request.

At step S801, the CPU 201 extracts size information of the print data from the reception packets transmitted from the host PC prior to transmission of the print data for LPR printing. Specifically, size information described in the LPR command is extracted from reception packets including the control command (LPR command) described above referring to FIGS. 4, 5A and 5B. As such, the CPU 201 acquires a size of the print data from the control command (LPR command) transmitted from the host PC prior to transmission of the print data. Subsequently, at step S802, the CPU 201 determines whether or not a size of the print data indicated by the extracted size information exceeds a size of the spool area reserved for spooling the print data.

The CPU 201 advances the process to step S803 in a case where a size of the print data exceeds a size of the spool area. At step S803, the CPU 201 sets a size exceeded flag to ON (e.g., to a value 1) and advances the process to step S704. On the other hand, in a case where the size of the print data does not exceed the size of the spool area, the CPU 201 advances the process to step S804. At step S804, the CPU 201 sets the size exceeded flag to OFF (e.g., value 0) and advances the process to step S704. As such, the size exceeded flag being ON indicates that the size of the print data exceeds (surpasses) the size of the spool area. Here, the setting value of the size exceeded flag is stored in the ROM 203 or the HDD 204.

The processing of steps S704 to S708 are similar to those of the first embodiment. In the present embodiment, upon determining at step S708 that a time-out event has occurred according to a predetermined timer, the CPU 201 advances the process to step S805, or returns the process to step S704 upon determining that there has not occurred any time-out event.

At step S805, the CPU 201 refers to the setting value of the stored size exceeded flag to determine whether or not the size exceeded flag is set to ON. In a case where the size exceeded flag is set to OFF (i.e., the size of the print data is equal to or smaller than the size of the spool area), the CPU 201 returns the process to step S704. And then, the CPU 201 waits until the reception inhibiting factor is resolved and reception of print data is resumed. On the other hand, in a case where the size exceeded flag is set to ON (i.e., the size of the print data exceeds the size of the spool area), the CPU 201 advances the process to step S710.

At step S710, the CPU 201 transmits, via the LAN I/F 208, the RST packet (RST command) to the host PC which is the transmission source of print data, similarly to the first embodiment. In other words, transmission of the RST packet causes disconnection of the connection with the host PC proactively from the printer (MFP 100) side.

As such, the CPU 201 controls whether or not to disconnect the connection with the external apparatus from the MFP 100 side, based on the size of the print data transmitted from the external apparatus (host PC) and the size of the spool area. Specifically, the CPU 201 transmits the RST packet to the external apparatus in a case where a predetermined time has elapsed in a state where reception of print data from the external apparatus remains stopped, and the size of the print data transmitted from the external apparatus exceeds the size of the spool area. The RST packet corresponds to a disconnection request for requesting to disconnect the connection. On the other hand, the CPU 201 maintains the connection with the external apparatus in a case where the predetermined time has elapsed in a state where reception of print data from the external apparatus remains stopped, and the size of the print data transmitted from the external apparatus does not exceed the size of the spool area. In such a case, the entire received print data can be stored in the spool area even when the printing process remains stopped, and therefore reception of print data is continued while maintaining the connection.

Upon completion of disconnection of the connection with the host PC subsequent to transmission of the RST packet at step S710, the CPU 201 terminates the reception process of print data according to the procedure illustrated in FIG. 8.

In the present embodiment, as has been described above, the CPU 201 establishes a connection with an external apparatus (host PC) in accordance with a predetermined communication protocol, receives print data transmitted from the external apparatus via the connection, and temporarily stores the print data in the spool area. The CPU 201 performs a printing process based on print data stored in the spool area. In a case where reception of print data from the external apparatus is stopped halfway through and a predetermined time has elapsed in a state where the reception remains stopped, the CPU 201 further controls whether or not to disconnect the connection with the external apparatus from the MFP 100 side, based on a size of the print data transmitted from the external apparatus and a size of the spool area.

As such, it is possible to dynamically perform switching of the operation, in a case where reception of print data remains stopped, to match with the host PC being connected. Accordingly, it becomes possible to normally resume the printing process even when reception in the MFP 100 of print data from the external apparatus is stopped halfway through.

Third Embodiment

Next, there will be described a third embodiment of the present disclosure. In the following, description of parts similar to those of the first and the second embodiments will be omitted.

The second embodiment allows for dynamically switching between disconnecting (S710) the connection from the printer side, and waiting for reception (S707) of the FIN packet from the host PC side, in accordance with whether or not a size of the print data exceeds a size of the spool area. However, as has been described above, a state where reception of print data from the host PC remains stopped halfway through continues, unless the inhibiting factor that inhibits reception of print data is resolved. In such a state, disconnection of the connection occurs between the host PC and the printer when, for example, transition to sleep or rebooting occurs in the host PC, or when transition to sleep (error sleep) occurs in the MFP 100 without the error being resolved. As a result, there is a possibility that the cancel operation of the print job may fail in the MFP 100, thereby printed material with an abnormality occurring thereon being output.

The MFP 100 according to the present embodiment therefore performs the following operations in order to avoid outputting printed material with an abnormality occurring thereon. The MFP 100 controls whether or not to disconnect the connection with the external apparatus from the MFP 100 side, based on whether or not the spool area is formed of a volatile memory, in a case where a predetermined time has elapsed in a state where reception of print data from the external apparatus remains stopped, and a size of the print data transmitted from the external apparatus does not exceed a size of the spool area.

<Processing Procedure>

Figure 9:
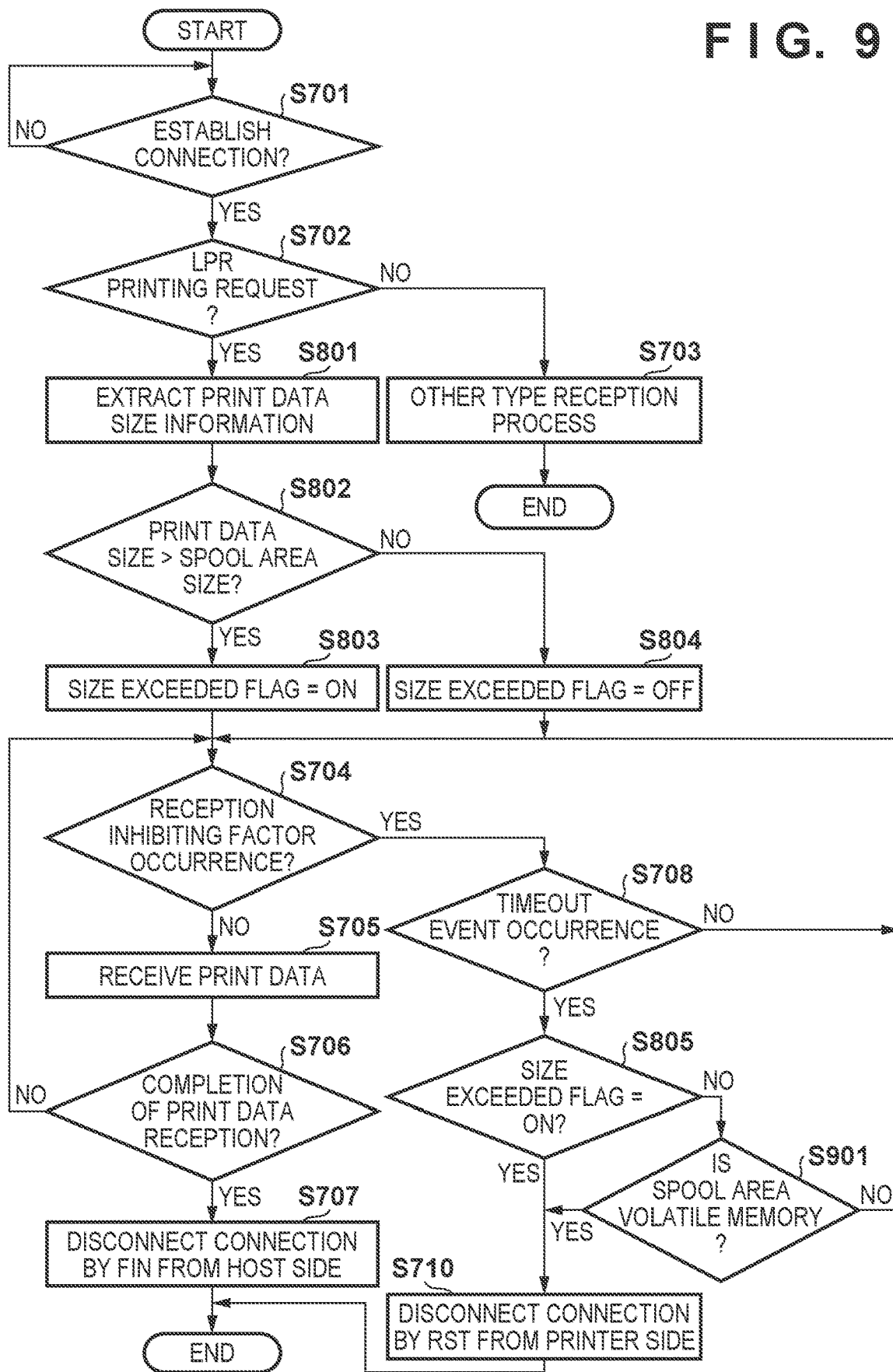
FIG. 9 is a flowchart illustrating a procedure of a print data reception process (third embodiment).

FIG. 9 is a flowchart illustrating a processing procedure of the print data reception process to be executed by the CPU 201 in the MFP 100 according to the present embodiment. The processing at each step of FIG. 9 can be realized in the MFP 100 by the CPU 201 that reads out a program stored in the ROM 203 or the HDD 204 to the RAM 202 and executes it thereon.

The processing of steps S701 to S703, S801 to S804, S704 to S708, and S805 are similar to those of the second embodiments. In the present embodiment, the CPU 201 advances the process to step S901 in a case where the size exceeded flag is set to OFF at step S808 (i.e., a size of the print data is equal to or smaller than a size of the spool area).

At step S901, the CPU 201 determines whether or not the spool area is formed of a volatile memory. In a case where the spool area is formed of a non-volatile memory (HDD, SD memory, USB memory, etc.), the CPU 201 returns the process to step S704, or advances the process to step S710 in a case where the spool area is formed of a volatile memory.

At step S710, the CPU 201 transmits, via the LAN I/F 208, the RST packet (RST command) to the host PC which is the transmission source of print data, similarly to the first and second embodiments. In other words, transmission of the RST packet causes disconnection of the connection with the host PC proactively from the printer (MFP 100) side. Upon completion of disconnection of the connection with the host PC in the aforementioned manner, the CPU 201 terminates the reception process of print data according to the procedure illustrated in FIG. 7.

As has been described above, the MFP 100 according to the present embodiment operates in the following manner, in a case where a predetermined time has elapsed in a state where reception of print data from the external apparatus remains stopped, and the size of the print data transmitted from the external apparatus does not exceed the size of the spool area. Specifically, the MFP 100 transmits, to the external apparatus, a disconnection request for requesting to disconnect the connection in a case where the spool area is formed of a volatile memory. On the other hand, the MFP 100 maintains the connection with the external apparatus, in a case where the spool area is formed of a non-volatile memory. As such, the MFP 100 maintains the connection with the external apparatus only when the spool area is formed of a non-volatile memory, in a case where the size of the print data transmitted from the external apparatus does not exceed the size of the spool area. According to the aforementioned process, it becomes possible to normally resume the printing process while avoiding outputting printed material with an abnormality occurring thereon, even when reception of print data from the external apparatus is stopped halfway through in the MFP 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-191432, filed Nov. 25, 2021, which is hereby incorporated by reference herein in its entirety.

What is claimed is:

1. A printing apparatus capable of communicating with an external apparatus, the printing apparatus comprising:
at least one processor and at least one memory coupled to the at least one processor and having instructions stored thereon that, when executed by the at least one processor, cause the at least one processor to act as:
an establishment unit configured to establish a connection with an external apparatus in accordance with a predetermined communication protocol;
a reception unit configured to receive, and temporarily store in a spool area, print data transmitted from the external apparatus via the connection;
a printing unit configured to perform a printing process based on print data stored in the spool area; and
a control unit configured to control whether or not to disconnect the connection with the external apparatus from the printing apparatus side, in accordance with a setting preliminarily made by a user operation, in a case where reception of print data from the external apparatus is stopped halfway through and a predetermined time has elapsed in a state where the reception remains stopped, wherein the control unit maintains the connection with the external apparatus, in a case where the predetermined time has elapsed in a state where reception of print data from the external apparatus remains stopped and it has been set not to disconnect the connection with the external apparatus from the printing apparatus side.

2. The printing apparatus according to claim 1, wherein the at least one processor further acts as a setting unit configured to set, in accordance with a user operation accepted via a setting screen displayed on a display unit of the printing apparatus, whether or not to disconnect the connection with the external apparatus from the printing apparatus side in a case where a predetermined time has elapsed in a state where reception of print data from the external apparatus remains stopped.

3. The printing apparatus according to claim 1, wherein the control unit transmits to the external apparatus a disconnection request for requesting to disconnect the connection, in a case where the predetermined time has elapsed in a state where reception of print data from the external apparatus remains stopped, and it has been set to disconnect the connection with the external apparatus from the printing apparatus side.

4. A printing apparatus capable of communicating with an external apparatus, the printing apparatus comprising:
at least one processor and at least one memory coupled to the at least one processor and having instructions stored thereon that, when executed by the at least one processor, cause the at least one processor to act as:
an establishment unit configured to establish a connection with an external apparatus in accordance with a predetermined communication protocol;
a reception unit configured to receive, and temporarily store in a spool area, print data transmitted from the external apparatus via the connection;
a printing unit configured to perform a printing process based on print data stored in the spool area; and
a control unit configured to control whether or not to disconnect the connection with the external apparatus from the printing apparatus side, based on a size of the print data transmitted from the external apparatus and a size of the spool area, in a case where reception of print data from the external apparatus is stopped halfway through and a predetermined time has elapsed in a state where the reception remains stopped, wherein the control unit maintains the connection with the external apparatus, in a case where the predetermined time has elapsed in a state where reception of print data from the external apparatus remains stopped, and the size of the print data transmitted from the external apparatus does not exceed the size of the spool area.

5. The printing apparatus according to claim 4, wherein the control unit acquires the size of the print data from a control command transmitted prior to transmission of the print data from the external apparatus.

6. The printing apparatus according to claim 4, wherein the control unit transmits to the external apparatus a disconnection request for requesting to disconnect the connection, in a case where the predetermined time has elapsed in a state where reception of print data from the external apparatus remains stopped, and the size of the print data transmitted from the external apparatus exceeds the size of the spool area.

7. The printing apparatus according to claim 1, wherein the predetermined time is determined to be a shorter time than a time-out time for canceling a print job in the external apparatus in a case where reception of print data by the printing apparatus is not resumed.

8. The printing apparatus according to claim 1, wherein the at least one processor further acts as a change unit configured to change the predetermined time in accordance with a user operation accepted via a setting screen displayed on a display unit of the printing apparatus.

9. The printing apparatus according to claim 1, wherein the predetermined communication protocol is a Line Printer Daemon (LPD) protocol.

10. A method for controlling a printing apparatus capable of communicating with an external apparatus, the method comprising:
establishing a connection with an external apparatus in accordance with a predetermined communication protocol;
receiving, and temporarily storing in a spool area, print data transmitted from the external apparatus via the connection;
performing a printing process based on print data stored in the spool area; and
controlling whether or not to disconnect the connection with the external apparatus from the printing apparatus side, in accordance with a setting preliminarily made by a user operation, in a case where reception of print data from the external apparatus is stopped halfway through and a predetermined time has elapsed in a state where the reception remains stopped, wherein the controlling includes maintaining the connection with the external apparatus, in a case where the predetermined time has elapsed in a state where reception of print data from the external apparatus remains stopped and it has been set not to disconnect the connection with the external apparatus from the printing apparatus side.

11. A method for controlling a printing apparatus capable of communicating with an external apparatus, the method comprising:
establishing a connection with an external apparatus in accordance with a predetermined communication protocol;
receiving, and temporarily storing in a spool area, print data transmitted from the external apparatus via the connection;
performing a printing process based on print data stored in the spool area; and
controlling whether or not to disconnect the connection with the external apparatus from the printing apparatus side, based on a size of the print data transmitted from the external apparatus and a size of the spool area, in a case where reception of print data from the external apparatus is stopped halfway through and a predetermined time has elapsed in a state where the reception remains stopped, wherein the controlling includes maintaining the connection with the external apparatus, in a case where the predetermined time has elapsed in a state where reception of print data from the external apparatus remains stopped, and the size of the print data transmitted from the external apparatus does not exceed the size of the spool area.

12. A non-transitory computer readable storage medium storing a program for causing a computer to execute a method for controlling a printing apparatus capable of communicating with an external apparatus, the method comprising:
establishing a connection with an external apparatus in accordance with a predetermined communication protocol;
receiving, and temporarily storing in a spool area, print data transmitted from the external apparatus via the connection;

performing a printing process based on print data stored in the spool area; and controlling whether or not to disconnect the connection with the external apparatus from the printing apparatus side, in accordance with a setting preliminarily made by a user operation, in a case where reception of print data from the external apparatus is stopped halfway through and a predetermined time has elapsed in a state where the reception remains stopped, wherein the controlling includes maintaining the connection with the external apparatus, in a case where the predetermined time has elapsed in a state where reception of print data from the external apparatus remains stopped and it has been set not to disconnect the connection with the external apparatus from the printing apparatus side.

* * * * *